9203X
D. Russell,
Horse Power,
Patented Oct. 27, 1835.
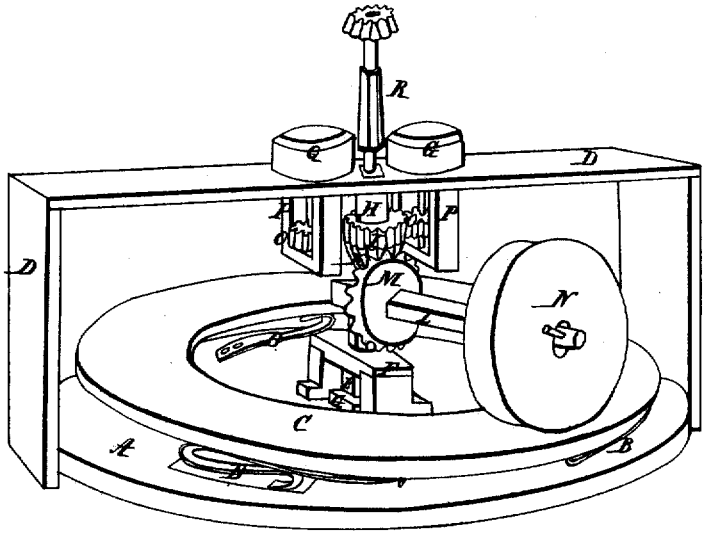
AM. PHOTO-LITHO. CO. N.Y. (OSBORNE'S PROCESS)

2387 9203X 137

David Russell
Letters Patent

The schedule referred to in these Letters Patent, and making part of the same, containing a description in the words of the said David Russell himself of his improvement in the "Power motion Machine" for propelling machinery.

Be it known that I David Russell of the town of Tuscumbia, in the County of Franklin, and State of Alabama, have made an improvement, being a machine for propelling machinery, called Russell's "Power motion Machine," which is described as follows, reference being had to the annexed drawings of the same, making part of this Specification.

A, represents the foundation of the Machine, made of suitable timber, well formed together —— B, the springs supporting the circular movable platform, made of spring steel of sufficient strength to support the platform and "pressure wheel" revolving thereon — C, The circular moveable platform made of plank 4 inches thick, 20 feet in diameter, & 2 feet wide resting in the springs — D, Posts and beams which support the gearing & Stones — E, Pillar made of cast iron, 4 inches square, & 6½ feet long — F, frame supporting the pillar —— G, cast iron segment to confine and secure the bottom of the pillar to the foundation —— H, perpendicular shaft 3 feet, 6 inches long & 4 inches square —— I, horizontal Cog wheel about 3 or 4 feet diameter, fixed on the shaft H —— K, bevelled pinion fixed also on Shaft H, 12 inches diameter — L, line shaft about 13 feet long, and (if made of iron) 4 inches square — M, Crown wheel on the end of the line shaft 3 feet diameter and working into the bevelled pinion K. — N, The pressure wheel fixed on the end of the line shaft, 6 feet diameter and 14 inches thick, made of oak plank, with a cast iron flange, two inches thick on its outer side. This wheel turns on the circular platform C — O, Two horizontal spur wheels, 10 inches diameter, mashing into

138

9203X the horizontal cog wheel. I, and propelled by the same. P, frames supporting the spindles of the stones, which spindles pass through the centre of the spur wheels — Q, The mill stones — R, another shaft and bevelled pinion to connect with the machinery — This Machine may be used to propel all kinds of machinery and may be propelled by steam, horse, water, or manual power and the gearing may be made of wood or of iron &c of any dimensions required —

What I claim as my invention and not previously known, and which I desire to secure by Letters Patent, consists in the combination and arrangement of the parts of the machine as before described for propelling machinery.

David Russell

Witnesses

H. B. Wm P. Elliott

Sam. Stettinius 504 words (Drawing)

(Patented October 27, 1835)